Jan. 26, 1971 W. WERNER 3,558,220
VIEWING HEAD FOR PERISCOPES
Filed April 6, 1964 4 Sheets-Sheet 1

Jan. 26, 1971  W. WERNER  3,558,220
VIEWING HEAD FOR PERISCOPES
Filed April 6, 1964  4 Sheets-Sheet 3

3,558,220
VIEWING HEAD FOR PERISCOPES
Walter Werner, Konigsbronn, Wurttemberg, Germany, assignor to Carl Zeiss-Stiftung, doing business as Carl Zeiss, Heidenheim on the Brenz, Wurttemberg, Germany, a corporation of Germany
Filed Apr. 6, 1964, Ser. No. 358,147
Claims priority, application Germany, Apr. 10, 1963, Z 10,044
Int. Cl. G02b 23/00
U.S. Cl. 350—319                                      6 Claims The invention relates to a viewing head for a periscope, particularly for submarines and aircrafts. The viewing head is able to permit a viewing within the range of the entire azimuth and in the height of −15° to +90°, and +15° to −90° respectively, over a field of view of 40° without any restriction of this field of view. The well-known closure hoods for periscopes which permit such a viewing possibility consist substantially of an oversize semi-spherical hood made preferably of glass.

The employment of such conventional closure hoods causes all types of complications; the production of such hoods is difficult and in most cases an auxiliary attachment lens arranged inside said hood is required to compensate for the optical negative effect caused by the spherical shell.

If one attempts to operate without such an attachment lens it is necessary to move the hypotenuse surface of the reflecting prism which is arranged in the periscope viewing head with the greatest accuracy about the center point of the sphere of the glass hood, because otherwise one will obtain different image qualities during the search operation covering the more than semi-spherical space. When the glass sphere has smaller dimensions and when the thickness of the walls is greater, very noticeable minus diopter effects are produced, and the glass path of the light rays passing through the deflecting prism is different between horizon view and zenith (nadir) view which unfavorably influences the optical path of the light rays. Above all, the oversize semi-spherical closure glass hood has the disadvantage, when the sun is shining, that in a certain distance from the same when the sun is positioned within a quarter sphere—and the center of the glass sphere comprises the center point—that one can see continuously a light reflection of the sun. The viewing head of the periscope in such instances gives his position away to any outside observer engaged in searching for submarines.

It is an object of the invention to overcome these disadvantages of the known oversize semi-spherical hood in that in accordance with the invention the closure hood is bevelled in a particular manner, that is, it is constructed from a plurality of abutting plane bevel faces of different inclinations.

Such a colsure hood is for instance obtained by assembling plane parallel plates to form a certain type of a dome structure by cementing the plane parallel plates in such a manner to one another that the closure hood is sealed against exterior pressure. If one applies to the abutting faces of the individual plates a light absorbing layer, for instance a black cement layer, which prevents the transmission of reflected light or scattered light from one plane plate to an adjacent plane plate, then undesirable light rays can no longer be transmitted through a plurality of plane plates and disturbing or dangerous reflections cannot be produced and cannot be transmitted. The cement layers do not cause any optical disturbance for the observer's eye. At an enlargement of 1.5 with an exit pupil of 7 mm. diameter of the telescope the abutment edges are positioned in front of an entrance pupil of about 10.50 mm. diameter at a six fold enlargement and an exit pupil of 4 mm. diameter of the telescope said abutment edges are positioned in front of an entrance pupil of 24 mm. diameter. Therefore the viewer will not notice the passage of such a cement layer in the exit pupil when the viewing field performs, for instance, an azimuthal movement.

According to another object of the invention a bevelled closure hood of the type mentioned may also be made by cementing glass plates into a thick-walled spherical or cylindrical shell having a suitable aperture angle and preferably being also made of glass. These plates have curved faces which are directed toward the curved inner surface of said closure shell, while the plane faces of these plates are directed toward the inner space of said shell. The outer surface of the shell is provided with milled and polished plane bevelled faces which are parallel to the inner plane faces of the plates. In any case there is obtained also according to this last mentioned method a closure body comprising a one piece outer cylindrical or spherical shell.

The outer dimensions of a colsure hood made in accordance with the invention are in any event smaller than the ones of a conventional oversize spherical closure glass hood provided with an inner attachment lens. Furthermore, the light ray reflecting prism in the periscope head, in view of the plane parallel plate effect, may be arranged eccentrically and as a result the inner circumscribed circular cylinder and the adjacent spherical body can become very small.

When using a colsure body made in accordance with the invention the sun reflections will become visible only when the sun is in certain definite positions with respect to an individual plane face of the closure hood. But in a submarine, for instance, in which the carrier of the bevelled hood performs continuous movements, these reflections will be noted by an outside observer only very briefly and can hardly be distinguished from the surrounding glittering water wave heads. The same advantage will have a closure body which in accordance with still another object of the invention is provided with a streamline shape to counteract or to prevent an undesirable eddy formation in the surrounding medium.

The abutting edges of two plane outer faces may be protected by wires, rods, sheets and the like, without causing these parts to become visible in the exit pupil.

The invention will now be described in greater detail with reference to the accompanying drawing in which.

Figure 1:
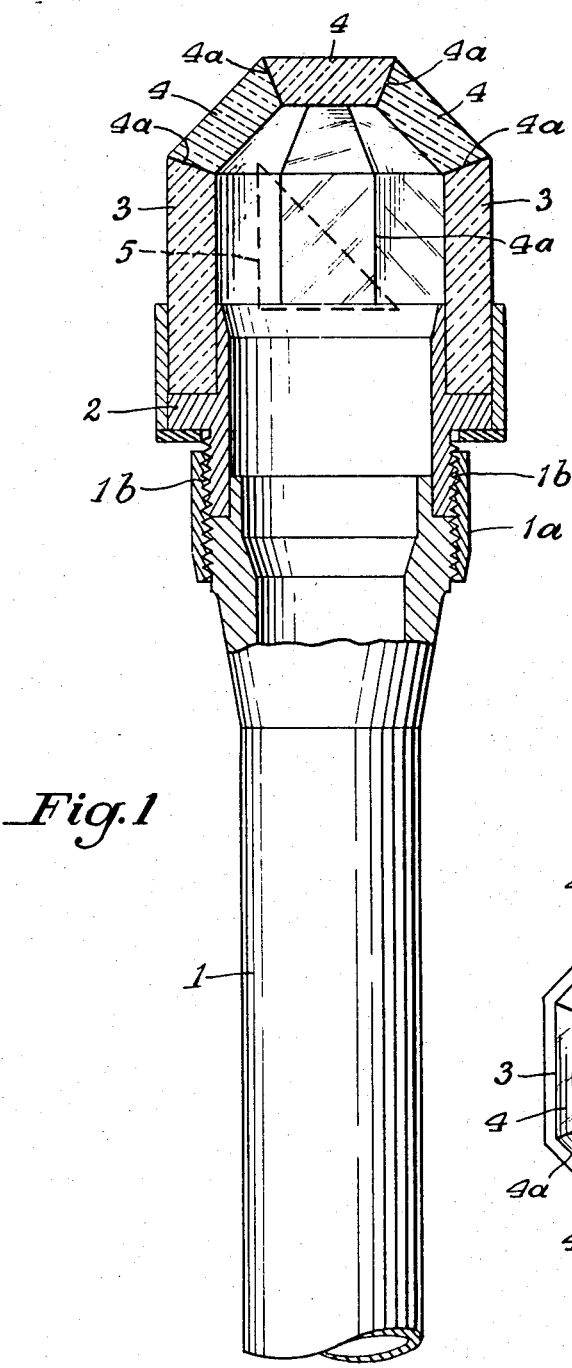
FIG. 1 illustrates a longitudinal sectional view of a closure body comprising a plurality of plane parallel plates.

Referring to FIG. 1, the vertical periscope tube 1 has threadedly mounted at its upper end by means of a sleeve 1a a mounting member 2 which in turn has attached thereto the viewing head proper. The sleeve 1a is provided with an interior thread 1b. The viewing head has the shape of a uniformly sided octagon assembled from plane parallel glass plates 3 which cemented together form a sleeve, and in addition thereto additional plane parallel plates 4 are used which form a dome-like cover in the shape of an eight-sided truncated pyramid. Between the abuting edges is arranged a light absorbing layer 4a, for instance a dark lacquer coating preventing the passage of reflecting light or scattered light rays from one plate to an adjacent plate. A reflecting prism 5 is arranged within the viewing head and is indicated in dash lines.

Figure 2:
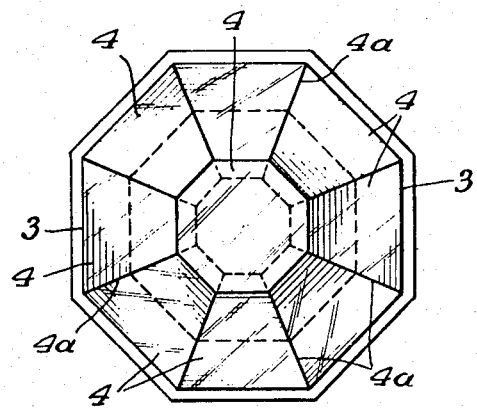
FIG. 2 is a top elevation view of the closure body shown in FIG. 1.

FIG. 2 is a top elevation view of the viewing head shown in FIG. 1.

Figure 3:
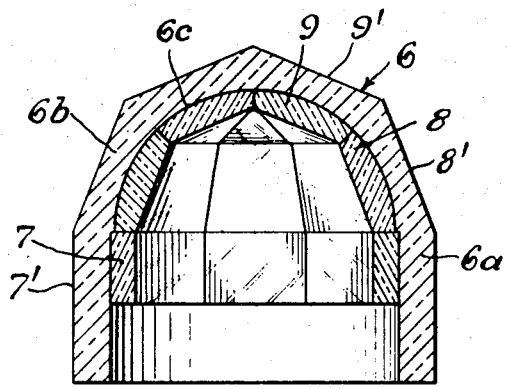
FIG. 3 illustrates a longitudinal sectional view of a modified closure body provided with a closed shell having a spherical inner face and plates cemented therein.
Figure 4:
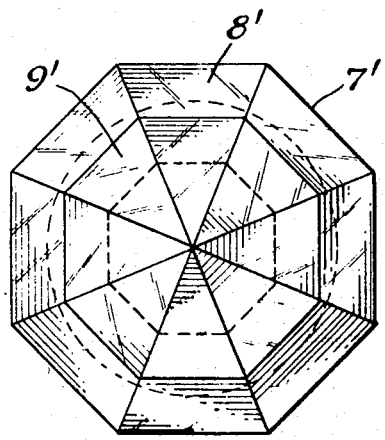
FIG. 4 is a top elevation view of the closure body shown in FIG. 3.

The FIGS. 3 and 4 illustrate a modified embodiment of the invention which in cross section shows a uniformly sided octagon. A hollow body 6 consisting of a single piece of glass is provided with a hollow cylindrical lower portion 6a while the upper portion 6b has a cavity which is approximately semi-spherical. This hollow body 6 has cemented therein three groups of each eight glass plates 7, 8 and 9. The faces of these plates engaging the inner wall of the body 6 are curved, in fact, they have the same radius of curvature as the inner wall of the body and a layer of transparent cement 6c is placed between the respective curved faces. The plane faces of the plates 7, 8 and 9 are directed inwardly toward the center of the body 6. Furthermore, the outer surface of the hollow body 6 is provided with plane bevel faces 7', 8' and 9' which are parallel to the inner plane faces of the plates 7, 8 and 9 respectively.

Figure 5:
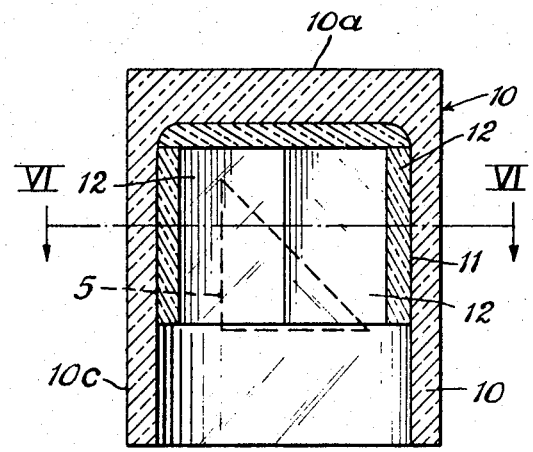
FIG. 5 is a longitudinal sectional view of a shell-like body with an inner cylindrical wall and plates cemented thereon.
Figure 6:
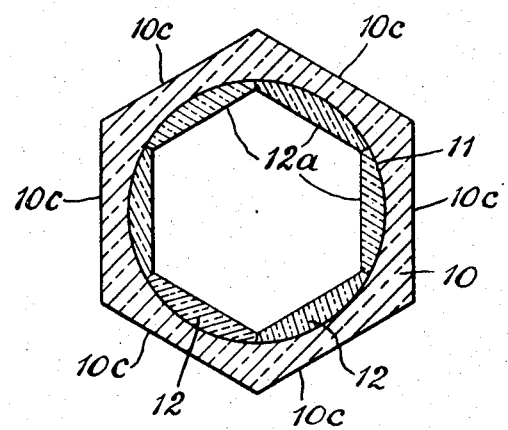
FIG. 6 is a cross-sectional view of the body along the line VI—VI of FIG. 5.

The FIGS. 5 and 6 illustrate another modification of the invention, namely a viewing head 10 having the outside shape of a uniformly side six-cornered prism with a plane roof surface 10a. The head comprises a hollow body made of a single piece of glass and has a cylindrical inner wall 11 to which six glass plates 12 are cemented whose inner faces 12a directed toward the interior of the body 10 are flat, while the outer faces of the glass plates 12 have the same radius of curvature as the inner wall 11 of the hollow glass body 10. The outer wall of the glass body 10 has six plane faces 10c which are parallel to the corresponding faces 12a on the plates 12 which are cemented to the wall 11. The dash lines in FIG. 5 indicate the position of the deflecting prism 5 in the viewing head.

Figure 7:
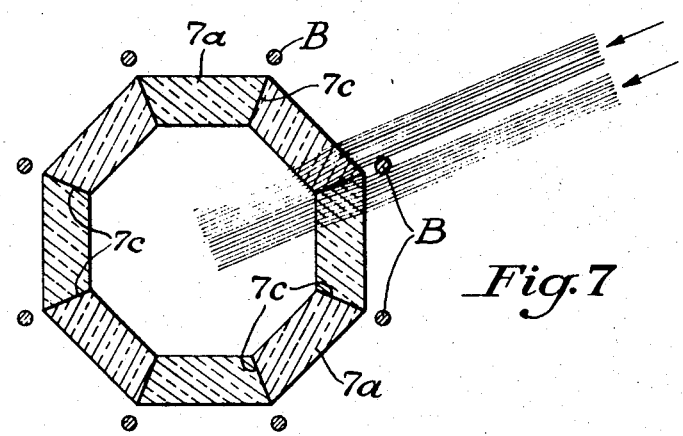
FIG. 7 illustrates the path of the light rays through two plane parallel plates.

FIG. 7 llustrates the path of a beam of parallel light rays when passing through two abutting plane parallel plates. As a result of the refraction of the light rays a gap is optically produced, the width of which depends upon the refraction index, the thickness and the inclination of the plates. (The same is about 2 mm. in the illustrated example.) It is therefore possible to surround the plane parallel plates 7a of the viewing head by a basket whose bars B are positioned parallel to one another and in front of the abutting edges 7c and so protect the viewing head against mechanical injury. The viewing field of the head would not be obscured by such a basket. It would also be possible to produce by using such basket bars an electrical field, so that these bars could also be used, for example, as a radar warning device.

Figure 8:
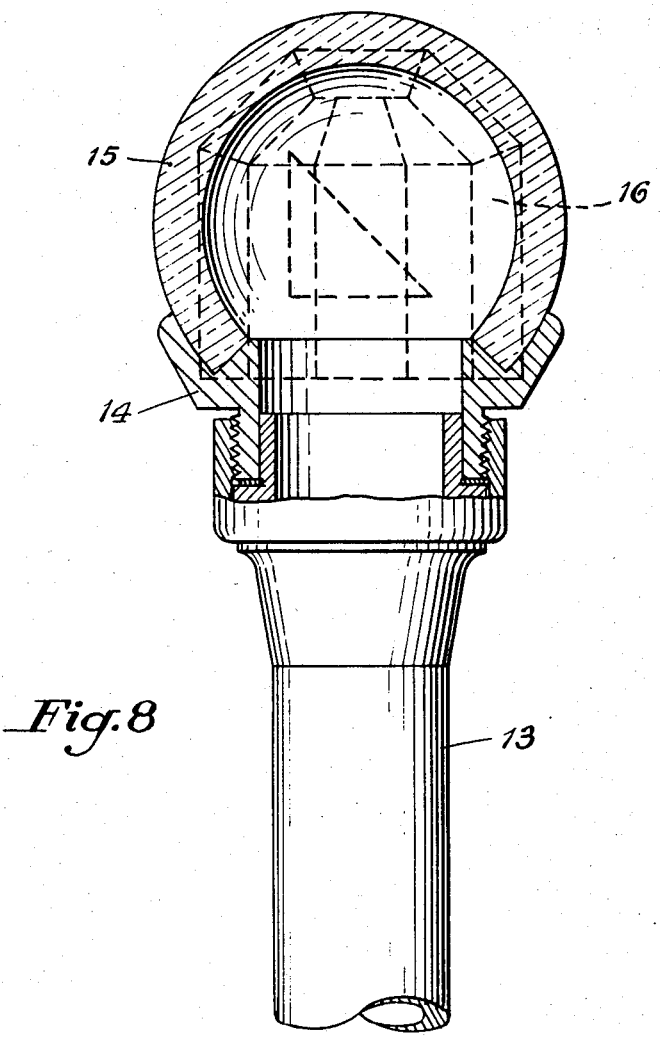
FIG. 8 is a longitudinal sectional view of a conventional oversize semi-spherical glass body in which a closure hood made from plane parallel plates in accordance with the invention has been drawn in for the sake of comparison.

FIG. 8 illustrates that a bevelled viewing head of the present invention may be constructed with smaller dimensions than an equivalent viewing head having the conventional form of an oversized semi-spherical hood. The mount 14 for the glass hood 15 is threadedly attached to the tube 13. Within this conventional hood 15 is indicated by dash lines a bevelled viewing hood 16 which is constructed in accordance with the present invention and is similar to the one shown in FIG. 1.

Figure 9:
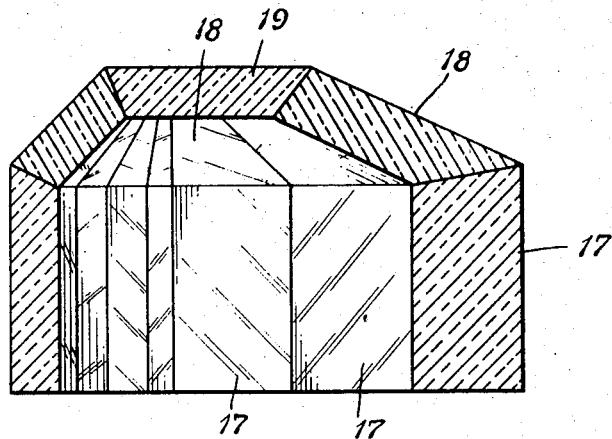
FIG. 9 illustrates in a longitudinal sectional view a stream-lined viewing head made from plane parallel plates; the section is taken along the line IX—IX of FIG. 10.
Figure 10:
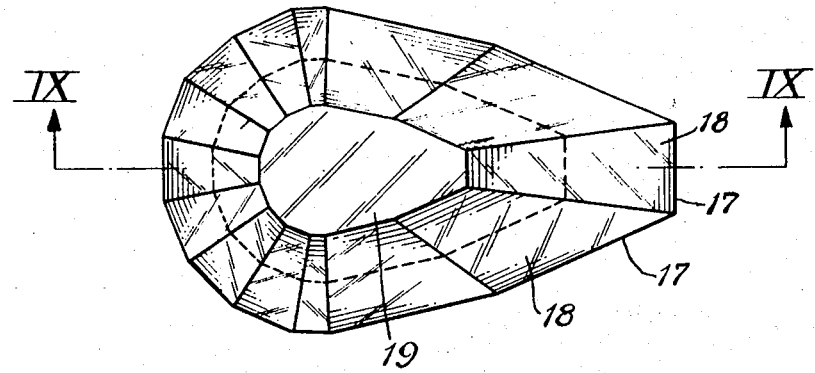
FIG. 10 is a top elevation view of the viewing head shown in FIG. 9.

The FIGS. 9 and 10 illustrate a streamlined embodiment of a viewing head of the present invention. The body is assembled of a plurality of plane parallel plates having different inclinations. The rectangular plates 17 form the lower perimeter, the plates 18 form a bevel-like cover with an aperture at the very top and this aperture is closed by a plate 19. The joints between abutting edges of all these plates are provided with a light absorbing coating which prevents the passage of light rays so that reflecting light and scattered light rays cannot pass from one plate to the adjacent ones.

A comparison of this streamlined embodiment with the other embodiments will show that also when producing a streamline body one may start with an integral hollow body in whose interior may be cemented a plurality of plates the flat or plane faces of which are directed inwardly, and the exterior surface of the hollow body may be provided with flat bevels which are positioned parallel to the inwardly directed faces on the plurality of plates.

What I claim is:

1. A viewing head for a periscope having a hood comprising a plurality of glass bodies directly cemented together, said hood having an inner surface formed by a number of plane faces arranged at different inclinations to each other, said hood also having an outer surface formed by the same number of plane faces as said inner surface, each one of outer plane faces being parallel to an associated inner plane face of said inner surface.

2. A viewing head according to claim 1, in which said hood includes a hollow transparent glass body having a curved inner surface and a plurality of transparent glass plates having a curved face and opposite the latter a plane face, said glass plates being cemented with their curved faces to said curved inner surface of said hollow body and with their edges to the edges of the glass plates disposed adjacent the same in abutting relation, said hollow transparent body having its exterior surface formed into a plurality of adjacent plane faces which are parallel to the plane faces on said glass plates.

3. A viewing head for a periscope, comprising a hood including a plurality of plane parallel plates having a different inclinations to each other and bevelled edges and arranged with their bevelled edges in abutting relation, said plane parallel plates being provided on their abutting edges with a thin layer of a material which prevents the passage of reflected light from one plate to the adjacent plates.

4. A viewing head for a periscope, comprising a streamlined hood including a plurality of plane parallel glass plates having different inclinations to one another and arranged in adjacent relation, said plates being cemented together along their edges in abutting relation by a thin layer of cement which prevents the passage of reflected light rays from one plate to the adjacent plates.

5. A viewing head for a periscope, comprising a streamlined hood including a plurality of plane parallel glass plates having different inclinations to one another and arranged in adjacent relation, said plates being cemented together along their edges in abutting relation by a thin layer of cement which prevents the passage of reflected light rays from one plate to the adjacent plates, and a basket surrounding said hood and having bars arranged in front of the abutting edges between each two adjacent plane parallel plates.

6. A viewing head for a periscope comprising a hood including a thick walled hollow body of transparent glass and having a curved inner surface, a plurality of glass plates having a curved face and a plane face cemented with their curved faces to said curved inner surface, said curved faces of said plates having the same radius of curvature as said inner surface of said hollow body, said plates having their plane face directed toward the interior space in said hollow body, and the latter having its exterior surface provided with plane bevel faces which are parallel to said plane faces of said plates.

References Cited
UNITED STATES PATENTS

| | | | |
|---|---|---|---|
| 1,921,303 | 8/1933 | Raschka | 52—200 |
| 3,074,125 | 1/1963 | Miller | 52—201 |

VERLIN R. PENDEGRASS, Primary Examiner

U.S. Cl. X.R.

350—21